US012453952B1

(12) United States Patent
Ahmed et al.

(10) Patent No.: US 12,453,952 B1
(45) Date of Patent: Oct. 28, 2025

(54) NANOCOMPOSITE FOR THE IMMOBILIZATION OR DEGRADATION OF POLLUTANTS

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Mortaga Mohamed Mostafa Abou-Krisha, Riyadh (SA); Abdulrahman Ghonaim Awad Alhamzani, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/213,204

(22) Filed: May 20, 2025

(51) Int. Cl.
*B01J 20/04* (2006.01)
*B01J 20/28* (2006.01)
(Continued)

(52) U.S. Cl.
CPC ....... *B01J 20/041* (2013.01); *B01J 20/28004* (2013.01); *B01J 20/28011* (2013.01);
(Continued)

(58) Field of Classification Search
None
See application file for complete search history.

(56) References Cited

U.S. PATENT DOCUMENTS

2021/0340680 A1  11/2021  Licht

FOREIGN PATENT DOCUMENTS

CN   105609721 A      5/2016
CN   107946585 A  *   4/2018  ............ H01M 4/364
(Continued)

OTHER PUBLICATIONS

Jia et al. (Tribiology International, 2015, 90, 240-247). (Year: 2015).*
(Continued)

*Primary Examiner* — Clare M Perrin
(74) *Attorney, Agent, or Firm* — Oblon, McClelland, Maier & Neustadt, L.L.P.

(57) ABSTRACT

A particulate nanocomposite material comprising, as determined by X-ray diffraction (XRD): an orthorhombic $CaB_2O_4$ crystalline phase; a triclinic $MnMgB_2O_5$ crystalline phase; and, a $Ca_3B_2O_6$ crystalline phase. The particulate nanocomposite material has, based on the total number of atoms in the nanocomposite material: an atomic concentration of carbon (C) of from about 0.1 to about 5 atom %; an atomic concentration of calcium (Ca) of from about 5 to about 15 atom %; an atomic concentration of boron (B) of from about 1 to about 10 atom %; an atomic concentration of manganese (Mn) of from about 5 to about 15 atom %; and, an atomic concentration of magnesium (Mg) of from about 5 to about 15 atom %. The particulate nanocomposite material has utility in immobilizing inorganic contaminants disposed in an aqueous medium and in degrading organic pollutants disposed in an aqueous medium.

20 Claims, 5 Drawing Sheets

(51) Int. Cl.
- *B01J 20/30* (2006.01)
- *B01J 35/39* (2024.01)
- *B01J 35/70* (2024.01)
- *C01B 35/12* (2006.01)
- *C02F 1/28* (2023.01)
- *C02F 1/30* (2023.01)
- *C02F 1/72* (2023.01)
- *C02F 101/10* (2006.01)
- *C02F 101/30* (2006.01)

(52) U.S. Cl.
CPC ..... *B01J 20/28019* (2013.01); *B01J 20/3078* (2013.01); *B01J 35/39* (2024.01); *B01J 35/70* (2024.01); *C01B 35/128* (2013.01); *C02F 1/288* (2013.01); *C02F 1/30* (2013.01); *C02F 1/725* (2013.01); *C02F 1/281* (2013.01); *C02F 1/283* (2013.01); *C02F 2101/10* (2013.01); *C02F 2101/30* (2013.01); *C02F 2305/08* (2013.01); *C02F 2305/10* (2013.01)

(56) References Cited

FOREIGN PATENT DOCUMENTS

| | | |
|---|---|---|
| CN | 115133220 A | 9/2022 |
| JP | 2004-52084 A | 2/2004 |
| JP | 2004052084 A * | 2/2004 |

OTHER PUBLICATIONS

Li et al. (Journal of Materials Engineering and Performance, 2017, 26, 285-291). (Year: 2017).*

Fernandes, et al. (Physical review, 2003, 67, 104413). (Year: 2003).*

Zhengfeng Jia, et al., "Synthesis and wear behavior of oleic acid capped calcium borate/graphene oxide composites", Tribology International, vol. 90, Oct. 2015, pp. 240-247, Excerpts only, 4 pages.

A.S. Asyikin, et al., "The effect of manganese (IV) oxide doping on the optical and elastic properties of calcium borate glass derived from waste chicken eggshell", Optical Materials, vol. 121, Nov. 2021, 111540, Excerpts only, 5 pages.

* cited by examiner

NANOCOMPOSITE FOR THE IMMOBILIZATION OR DEGRADATION OF POLLUTANTS

BACKGROUND

Technical Field

The present disclosure is directed towards a nanocomposite material, and more particularly, relates to a particulate nanocomposite material and a method of preparation thereof, wherein the particulate nanocomposite material has utility in immobilizing inorganic contaminants and degrading organic pollutants.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Nanocomposites have garnered significant attention due to their mechanical, thermal, electrical, and catalytic properties, which make them suitable for a wide range of applications. Exemplary applications for nanocomposites include environmental remediation, electronic devices, energy storage systems, and biomedical applications. Moreover, the ability to tailor the structural and compositional characteristics of nanocomposites has led to their widespread adoption in high-performance materials science. Current nanocomposite materials, including borate-based compounds which are the subject of the present disclosure, exhibit promising functionalities. However, the limitations associated with their conventional synthesis methods hinder commercial viability and large-scale implementation of the nanocomposites.

Traditional methods for synthesizing nanocomposites, including co-precipitation and hydrothermal processes, often involve high processing costs, labour-intensive procedures, and limited control over particle morphology, crystallinity, and composition. In particular, conventional syntheses of calcium, magnesium, and manganese borates rely on energy-intensive reactions that may require stringent temperature and pressure conditions. The prior art methods often lead to inhomogeneous particle distribution, irregular morphologies, and significant material waste, limiting the efficiency and reproducibility of the final product. In addition, the difficulty in controlling the nanoscale features of the synthesized materials results in sub-optimal physicochemical properties, reducing their effectiveness in multifunctional applications.

Despite advancements in nanocomposite synthesis, several critical challenges remain unresolved. Many existing methods exhibit low yield and poor scalability, hindering mass production while maintaining desirable properties. The inability to control particle size and shape further exacerbates the issue, as these parameters significantly influence the mechanical strength, stability, and functional performance of nanocomposites. Further, the presence of impurities and agglomeration during synthesis degrades the structural integrity of the materials, adversely affecting their overall utility. The above-mentioned factors necessitate the development of an improved method that enhances compositional precision, ensures structural uniformity, and maintains a cost-effective and environmentally friendly synthesis process.

The demand for high-performance nanocomposite materials has intensified across various industries, emphasizing the need for innovative synthesis techniques that address the limitations of current methodologies. An effective approach must facilitate uniform particle dispersion, prevent agglomeration, and achieve precise control over nanoscale properties to maximize functionality. Furthermore, the increasing emphasis on sustainable and scalable production methods highlights the necessity of adopting synthesis strategies that minimize energy consumption and reduce chemical waste.

Accordingly, one object of the present disclosure is to provide a particulate nanocomposite material and a method of production thereof, that may circumvent the aforementioned drawbacks and limitations of methods and materials known in the art.

SUMMARY

In an exemplary embodiment, a particulate nanocomposite material is disclosed. The disclosed particulate nanocomposite comprises, as determined by X-ray diffraction (XRD): an orthorhombic $CaB_2O_4$ crystalline phase; a triclinic $MnMgB_2O_5$ crystalline phase; and, a $Ca_3B_2O_6$ crystalline phase. The nanocomposite is further characterized in that, based on the total number of atoms in the nanocomposite material: the atomic concentration of carbon (C) is from about 0.1 to about 5 atom %; the atomic concentration of calcium (Ca) is from about 5 to about 15 atom %; the atomic concentration of boron (B) is from about 1 to about 10 atom %; the atomic concentration of manganese (Mn) is from about 5 to about 15 atom %; and, the atomic concentration of magnesium (Mg) is from about 5 to about 15 atom %.

In some embodiments, based on the total number of atoms in the nanocomposite material: the atomic concentration of carbon (C) is from about 1 to about 3 atom %; the atomic concentration of calcium (Ca) is from about 9 to about 12 atom %; the atomic concentration of boron (B) is from about 3 to about 6 atom %; the atomic concentration of manganese (Mn) is from about 12 to about 15 atom %; and, the atomic concentration of magnesium (Mg) is from about 7 to about 10 atom %.

In some embodiments, the particulate nanocomposite material has a volume average crystallite size, as determined by X-ray diffraction, of from about 65 nanometers (nm) to about 75 nm.

In some embodiments, the particulate nanocomposite material includes substantially spherical particles and agglomerates thereof.

In some embodiments, the particulate nanocomposite material has a median volume particle size (Dv50) of from about 100 nm to about 200 nm, as determined by high-resolution transmission electron microscopy (HRTEM).

In another exemplary embodiment, a method for preparing the particulate nanocomposite material is described. The method comprises: forming an aqueous mixture by adding an aqueous solution of a chelating agent into an aqueous solution of a magnesium salt, a calcium salt, a manganese salt and boric acid; adding a polyol into the aqueous mixture to form a gel; heating the gel under stirring at a temperature of from about 150° C. to about 300° C. for a sufficient duration to form a dry powder; and, calcining the dry powder at a temperature of from about 600° C. to about 800° C. to form the nanocomposite material.

In some embodiments, the aqueous solution of the chelating agent is added in a dropwise manner into the aqueous solution of the magnesium salt, the calcium salt, the manganese salt and boric acid.

In some embodiments: the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$); the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$); and, the manganese salt is selected from the group consisting of manganese sulfate ($MnSO_4$), manganese nitrate ($Mn(NO_3)_2$), manganese chloride ($MnCl_2$) and manganese acetate ($Mn(CH_3COO)_2$).

In some embodiments: the magnesium salt is magnesium nitrate ($Mg(NO_3)_2$); the calcium salt is calcium nitrate ($Ca(NO_3)_2$); and, the manganese salt is manganese acetate ($Mn(CH_3COO)_2$).

In some embodiments, the chelating agent comprises at least one hydroxyalkyl carboxylic acid selected from the group consisting of citric acid, tartaric acid, malic acid, mandelic acid and 12-hydroxystearic acid.

In some embodiments, the chelating agent comprises or consists of tartaric acid.

In some embodiments, the polyol is added in a dropwise manner into the aqueous mixture.

In some embodiments, the polyol has a number average molecular weight (Mn) of from about 200 g/mol to about 5000 g/mol. and a hydroxyl number of from about 25 to about 500 mg KOH/g.

In some embodiments, the polyol is selected from the group consisting of polyester polyols, polyether polyols, poly(ether-ester) polyols, poly(alkylene carbonate) polyols, and mixtures thereof.

In some embodiments, the polyol includes a polyoxy ($C_2$-$C_3$)alkylene polyol.

In some embodiments, the polyol includes a polyoxy ($C_2$-$C_3$)alkylene polyol having a number average molecular weight (Mn) of from about 200 to about 5000 g/mol. and a hydroxyl number of from about 25 to about 500 mg KOH/g.

In yet another exemplary embodiment, a method of immobilizing inorganic contaminants disposed in an aqueous medium is described. The method includes contacting the aqueous medium with the particulate nanocomposite material as defined above.

In yet another exemplary embodiment, a method of degrading organic pollutants disposed in an aqueous medium is described. The method includes contacting the aqueous medium with the particulate nanocomposite material as defined above, while irradiating the medium with actinic irradiation.

Where the aspects of the disclosure are described above as having certain embodiments, any one or more of those embodiments can be implemented in or combined with any one of the further embodiments, even if that combination is not explicitly described. Expressed differently, the described embodiments are not mutually exclusive, and permutations thereof remain within the scope of this disclosure.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
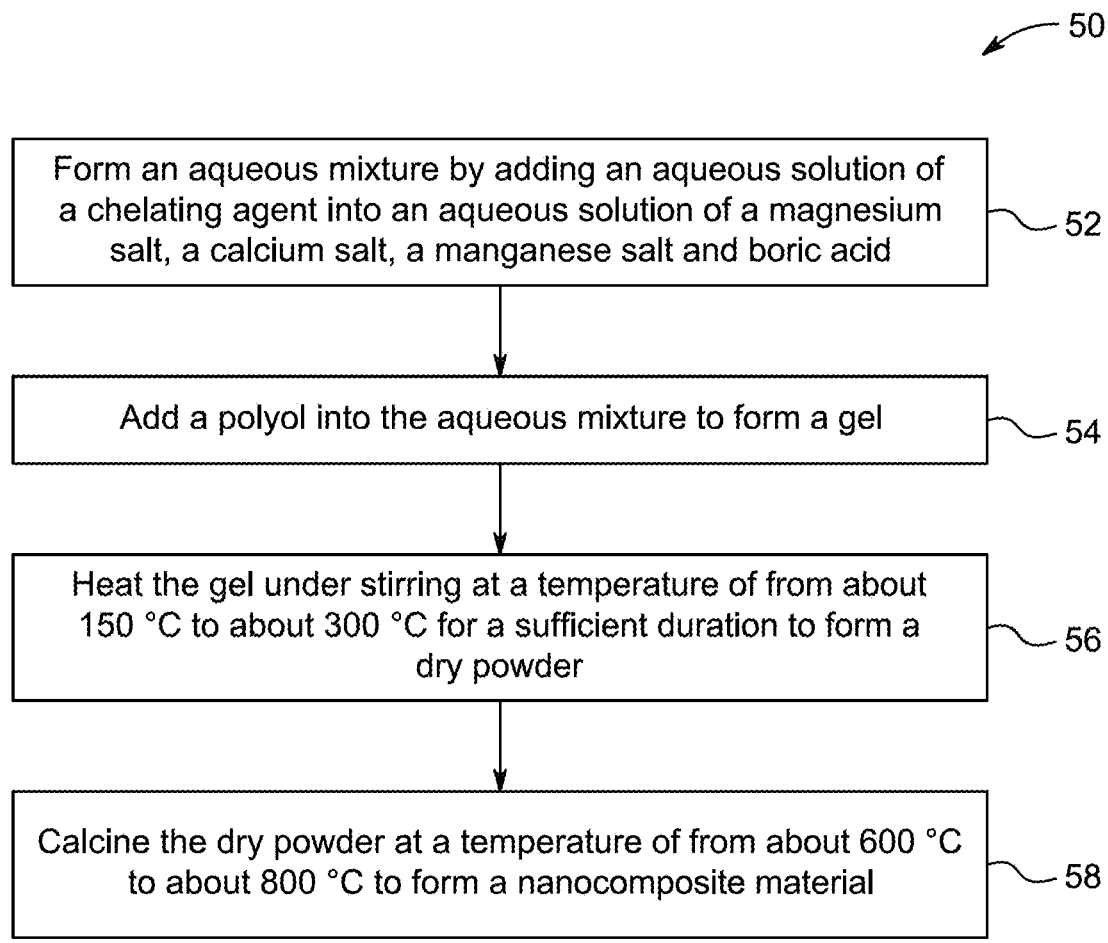
FIG. 1A is an exemplary flow chart of a method of preparing a particulate nanocomposite, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" refers to a temperature range of 23 degrees Celsius (° C.)±2° C. in the present disclosure. As used herein, "ambient conditions" means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term "fraction" refers to a numerical quantity which defines a part up to, but not including, 100 percent or the entirety of the thing in question.

As used herein the term "disposed" refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term "Scanning Electron Microscopy" or "SEM" refers to a surface-imaging technique that produces images of a sample by scanning the sample with a focused beam of electrons. Unless otherwise specified, the SEM shall include all imaging techniques using electron beams for imaging.

As used herein, the term "high-resolution transmission electron microscopy (HRTEM)" refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term "X-ray diffraction" or "XRD" or "X-ray crystallography" refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

The term "unit cell" as used herein refers to the smallest and simplest volume element (i.e., parallelpiped-shaped block) of a crystal that is completely representative of the unit or pattern of the crystal, such that the entire crystal can be generated by translation of the unit cell. The dimensions of the unit cell are defined by six numbers: dimensions a, b and c; and, angles $\alpha$, $\beta$ and $\gamma$ (Blundel et al., 1976, *Protein Crystallography*, Academic Press, the disclosure of which is incorporated herein by reference in its entirety). A crystal is an efficiently packed array of many unit cells.

The term "triclinic crystalline phase" refers to a crystal structure in which the unit cell is characterized by three mutually perpendicular aces of unequal length ($a \neq b \neq c$) wherein further $\alpha \neq \beta \neq \gamma$.

An orthorhombic crystalline phase refers to a crystal structure having three mutually perpendicular axes of unequal lengths ($a \neq b \neq c$) but wherein the crystal lattice forms a rectangular prism where the edges represent the three axes, all intersecting at 90-degree angles ($\alpha = \beta = \gamma = 90°$).

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, the term "particle" refers to a small object that acts as a whole unit with regard to its transport and properties. As used herein, "nanoparticles"—sometimes contracted herein to NPs—refers to particles having a particle size of 1 nanometer (nm) to 1000 nm.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90" refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term "nanocomposite" refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant ($\varepsilon$) of more than 5 as measured at 25° C. The determination of dielectric constant ($\varepsilon$) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

The term "dropwise" as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term "sol-gel method" refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term "sol" as used herein, refers to a colloidal suspension of solid particles in a continuous liquid medium.

As used herein, the term "gel" refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

As used herein, the term "calcination" refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, "$C_1$-$C_n$ alkyl" group refers to a monovalent group that contains from 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term "alkylene" refers to a divalent radical derived from an alkyl group as defined above.

The term "polyoxyalkylene"-alternatively referenced as polyalkylene oxide-refers herein to an aliphatic polyether which is built from repeated —O-A- units, wherein A is alkylene, for instance $C_2$-$C_5$ alkylene. The term "polyoxy($C_2$-$C_3$)alkylene" encompasses polyoxyethylene, polyoxypropylene and poly(oxyethylene-co-oxypropylene).

The term "polyol" as used herein shall include diols and higher functionality hydroxyl compounds. The term "polyether polyol" refers to a compound, which may be linear or branched, that contains at least two ether groups and at least two hydroxyl groups. The term "polyester polyol" references a polymeric compound, which may be linear or branched, that contains at least two ester linkages and at least two hydroxyl groups. Correspondingly, the term "poly(ether-ester) polyol" refers to a polyol containing both ether linkages (C—O—C) and ester linkages (R—COO—R) within its structure.

The term "hydroxyl number" as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

As used herein, the term "organic pollutant" refers to a type of pollutant that contains carbon-based compounds, generally originating from human activities. These pollutants may come from sources such as pesticides, industrial chemicals, plastics, and solvents. They tend to be harmful to the environment and living organisms, as they can be toxic, persistent, and bioaccumulate in ecosystems. Examples include substances such as benzene, dichlorodiphenyltrichloroethane (DDT), and polychlorinated biphenyls (PCBs). Herein, the organic pollutant may be a dye, a phenol, a polycyclic aromatic hydrocarbon, an herbicide, a pesticide, a persistent organic pollutant, and so on.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

The present disclosure is intended to include all hydration states of a given compound or formula, unless otherwise noted or when heating a material.

Aspects of the present disclosure are directed to a particulate nanocomposite material which comprises calcium metaborate ($CaB_2O_4$), magnesium manganese borate ($MnMgB_2O_5$), calcium borate ($Ca_3B_2O_6$), and carbon (C) and which is fabricated using the Pechini sol-gel method. The nanocomposite fabricated by the method of present disclosure yields a uniform and high-crystallinity material with enhanced structural and compositional properties.

A particulate nanocomposite is described. The particulate nanocomposite material includes, as determined by X-Ray Diffraction (XRD): an elemental carbon; an orthorhombic $CaB_2O_4$ crystalline phase; a triclinic $MnMgB_2O_5$ crystalline phase; and, a $Ca_3B_2O_6$ crystalline phase.

In some embodiments, based on the total number of atoms in the particulate nanocomposite material, the particulate nanocomposite material has: an atomic concentration of carbon (C) of from about 0.1 to about 5 atom %, for example about 0.2-4.5 atom %, about 0.3-4.3 atom %, about 0.4-4.1 atom %, about 0.5-4.0 atom %, about 0.6-3.8 atom %, about 0.7-3.6 atom %, about 0.8-3.4 atom %, about 1-3.2 atom %, about 1.2-3.0 atom %, about 1.4-2.8 atom %, about 1.6-2.6 atom %, about 1.8-2.4 atom % or about 2-2.2 atom %.

In some embodiments, based on the total number of atoms in the particulate nanocomposite material, the particulate nanocomposite material has: an atomic concentration of calcium (Ca) of from about 5 to about 15 atom %, for example about 5.5-14.5 atom %, about 6-14 atom %, about 6.5-13.5 atom %, about 7-13 atom %, about 7.5-12.5 atom %, about 8-12 atom % or about 8.5-11.5 atom %.

In some embodiments, based on the total number of atoms in the particulate nanocomposite material, the particulate nanocomposite material has: an atomic concentration of boron (B) of from about 1 to about 10 atom %, for example about 2-9 atom %, about 2.5-8.5 atom %, about 3-8 atom %, about 3.5-7.5 atom %, about 4-7 atom % or about 4.5-6 atom %.

In some embodiments, based on the total number of atoms in the particulate nanocomposite material, the particulate nanocomposite material has: an atomic concentration of manganese (Mn) of from about 5 to about 15 atom %, for example about 6-14 atom %, about 6.5-13.5 atom % or about 7-13 atom %.

In some embodiments, based on the total number of atoms in the particulate nanocomposite material, the particulate nanocomposite material has: an atomic concentration of magnesium (Mg) of from about 5 to about 15 atom %, for example about 6-14 atom %, about 7-13 atom %, about 8-12 atom % or about 9-11 atom %.

In some embodiments, based on the total number of atoms in the particulate nanocomposite material: the atomic concentration of C is from about 1 to about 3 atom %, for example about 1.5-2.5 atom %, about 1.7-2.4 atom % or about 1.9-2.2 atom %; the atomic concentration of Ca is from about 9 to about 12 atom %, for example about 9.5-11.5 atom %, about 9.7-11.4 atom %, or about 10-11.3 atom %; the atomic concentration of B is from about 3 to about 6 atom %, for example about 3.5-5.5 atom %, about 3.7-5.1 atom % or about 4-5 atom %; the atomic concentration of Mn is from about 12 to about 15 atom %, for example about 12.1-14.9 atom %, about 12.4-14.7 atom %, or about 12.6-14.5 atom %; and, the atomic concentration of Mg is from about 7 to about 10 atom %, for example about 7.1-9.9 atom %, about 7.2-9.8 atom %, about 7.3-9.7 atom %, about 7.4-9.6 atom %, about 7.5-9.5 atom %, about 7.6-9.4 atom % or about 7.8-9.2 atom %.

In some embodiments, the particulate nanocomposite material has a volume average crystallite size of about 65 to about 75 nm, for example about 66-74.5 nm, about 66.5-74 nm, about 66.7-73.5 nm, about 67-73 nm, about 67.5-72 nm, about 68-71 nm or about 68.5-70 nm, as determined by XRD. In a preferred embodiment, the average crystallite size of the particulate nanocomposite material is 69.64 nm.

In some embodiments, the particulate nanocomposite material may include spherical particles, ellipsoidal particles, rod-shaped particles, platelet-shaped particles, disc-shaped particles and aggregates thereof In some embodiments, the particulate nanocomposite material includes substantially spherical particles and agglomerates thereof. In some embodiments, the particulate nanocomposite material includes globular aggregates of rounded particles. In a preferred embodiment, the particulate nanocomposite material includes irregularly shaped and quasi-spherical particles.

In some embodiments, the particulate nanocomposite material has a median volume particle size (Dv50) of from about 100 to about 200 nm, for example about 105-190 nm, about 110-185 nm, about 115-180 nm, about 120-175 nm, about 125-170 nm, about 130-165 nm, about 135-160 nm, about 140-155 nm, about 145-150 nm, or about 147-149 nm, as determined by high-resolution transmission electron microscopy (HRTEM). In some embodiments, the particulate nanocomposite material has a median volume particle size (Dv50) of from about 125 to about 175 nm, for example about 130-170 nm, about 135-165 nm, about 140-160 nm or about 145-155 nm, as determined by HRTEM. In a preferred embodiment, the median volume particle size (Dv50) of the particulate nanocomposite material is 148.20 nm.

FIG. 1A illustrates a schematic flow chart of a method 50 of preparing the $CaB_2O_4/MnMgB_2O_5/Ca_3B_2O_6/C$ particulate nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming an aqueous mixture by adding an aqueous solution of a chelating agent into an aqueous solution of a magnesium salt, a calcium salt, a manganese salt, and boric acid. It is preferred that the chelating agent is added in a dropwise manner into the aqueous solution.

Exemplary magnesium salts which may be included in the aqueous solution either alone or in combination include but are not limited to magnesium chloride, magnesium sulfate, magnesium carbonate, magnesium oxide, magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate, magnesium formate, magnesium acetate, magnesium hypophosphite, magnesium tungstate, magnesium thiosulfate, magnesium nitride, magnesium aluminate, and magnesium succinate. In some embodiments, the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$). In a preferred embodiment, the magnesium salt is magnesium nitrate ($Mg(NO_3)_2$) or a hydrate thereof, such as $Mg(NO_3)_2 \cdot 6H_2O$.

Exemplary calcium salts which may be included in the aqueous solution either alone or in combination include but are not limited to calcium chloride, calcium sulfate, calcium carbonate, calcium hydroxide, calcium oxide, calcium acetate, calcium citrate, calcium lactate, calcium gluconate, calcium phosphate, calcium ascorbate, calcium benzoate, calcium malate, calcium fumarate, calcium oxalate, calcium stearate, calcium tartrate, calcium salicylate, calcium formate, calcium propionate, calcium valerate, calcium succinate, calcium iodide, calcium bromide, calcium fluoride, calcium thiocyanate, calcium perchlorate, calcium chromate, calcium molybdate, and calcium tungstate. In some embodiments, the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$). In a preferred embodiment, the calcium salt is calcium nitrate ($Ca(NO_3)_2$) or a hydrate thereof, such as $Ca(NO_3)_2 \cdot 4H_2O$.

Exemplary manganese salts which may be included in the aqueous solution either alone or in combination include, but are not limited to manganese (II) oxide (MnO), manganese (III) chloride ($MnCl_3$), manganese (IV) oxide ($MnO_2$), manganese (II) carbonate ($MnCO_3$), manganese (II) formate ($Mn(HCOO)_2$), manganese (II) phosphate ($Mn_3(PO_4)_2$), manganese (II) acetate monohydrate ($Mn(CH_3COO)_2 \cdot H_2O$), manganese (II) bromide ($MnBr_2$), manganese (II) iodide ($MnI_2$), manganese (III) acetate ($Mn(CH_3COO)_3$), manganese (II) sulfate monohydrate ($MnSO_4 \cdot H_2O$), manganese (II) pyrophosphate ($Mn_2P_2O_7$), manganese (II) gluconate (Mn(C$_6$H$_{11}$O$_7$)$_2$), manganese (II) lactate (Mn(C$_3$H$_5$O$_3$)$_2$), manganese (II) tartrate (Mn(C$_4$H$_4$O$_6$)), manganese (II) malate (Mn(C$_4$H$_6$O$_5$)), manganese (III) formate (Mn (HCOO)$_3$), manganese (II) citraconate (Mn(C$_5$H$_6$O$_4$)), and manganese (II) salicylate (Mn(C$_7$H$_6$O$_3$)). The manganese salt may, in exemplary embodiments, be selected from the group consisting of manganese sulfate (MnSO$_4$), manganese nitrate (Mn(NO$_3$)$_2$), manganese chloride (MnCl$_2$) and manganese acetate (Mn(CH$_3$COO)$_2$). In a preferred embodiment, the manganese salt is manganese acetate (Mn (CH$_3$COO)$_2$) or a hydrate thereof, such as Mn(CH$_3$COO)$_2$·4H$_2$O.

In some embodiments, the molar ratio of Mg:Ca:Mn:B in the aqueous solution is about (0.8-1.2):(0.8-1.2):(0.8-1.2):(3.2-4.8). For example, the molar ratio of ratio of Mg:Ca:Mn:B in the aqueous solution may be from about (0.9-1.1):(0.9-1.1):(0.9-1.1):(3.6-4.4). The molar ratio of Mg:Ca:Mn:B of about 1.0:1.0:1.0:4.0 is included within the latter exemplary range and itself represents a preferred molar ratio condition.

In some embodiments, the chelating agent includes at least one hydroxyalkyl carboxylic acid selected from the group consisting of citric acid, tartaric acid, malic acid, mandelic acid, and 12-hydroxystearic acid. In certain embodiments, salts or esters of said hydroxyalkyl carboxylic acids may be utilized.

Further exemplary chelating agents which may be present in addition to the aforementioned hydroxyalkyl carboxylic acids include, but are not limited to: isosteric acid; isocitric acid; aconitic acid; carboxylic acids, which may be saturated or unsaturated; dicarboxylic acids, which may be saturated or unsaturated and of which examples include adipic acid, fumaric acid, glutaconic acid, muconic acid, citraconic acid and succinic acid; tricarboxylic acids; aminopolycarboxylic acids, polycarboxylic acids; salts of said acids; or, esters of said acids. In some embodiments, the chelating agent may include one or more of disodium edetate, trisodium edetate, lactic acid, sodium polyphosphate, sodium metaphosphate or gluconic acid, and salicylic acid.

In some alternate embodiments, the chelating agent comprises or consists of tartaric acid. Tartaric acid includes natural and commercial forms of the acid. In some embodiments, tartaric acid is D-tartaric acid, L-tartaric acid, achiral tartaric acid or racemic mixture of D- and L-tartaric acid forms.

In some embodiments, the ratio of the total molar amount of chelating agent added to the aqueous solution to the total number of moles of Mg, Ca, Mn and B in the aqueous solution is from about 1:1 to 1:5. For example, the ratio of the total molar amount of chelating agent added to the aqueous solution to the total number of moles of Mg, Ca, Mn and B in the aqueous solution may be from about 1:2 to 1:5, from about 1:2 to 1:4, from about 1:2 to 1:3 or from about 2:5 to 1:3.

At step 54, the method 50 includes adding a polyol into the aqueous mixture to form a gel. The polyol is desirably added in a dropwise manner into the aqueous mixture. In some embodiments, the polyol has a number average molecular weight of from about 200 to about 5000 g/mol. and an hydroxyl number of from about 25 to about 500 mg KOH/g.

Typically herein, the polyol has: a number average molecular weight of from about 200 to about 5000 g/mol., preferably from about 200 to about 1000 g/mol. and more preferably from 200 to 500 g/mol.; and, a hydroxyl number of from about 25 to about 500 mg, more preferably 200 to 500 mg, and yet more preferably 200 to 300 mg KOH/g.

The polyols having utility in the present disclosure may be monomeric compounds, for instance monomeric aliphatic, cycloaliphatic or aromatic compounds having from 2 to 6 hydroxyl groups per molecule. Exemplary monomeric diols, which may be used alone or in combination include: ethylene glycol; propylene glycol; 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxalkylene glycols, such as diethylene glycol, dipropylene glycol, triethylene glycol, tetraethylene glycol, tripropylene glycol and tetrapropylene glycol; and, aromatic diols such as bisphenol A, bisphenol F, hydrogenated bisphenol A and hydrogenated bisphenol F. Exemplary triols, which may be used alone or in combination include: 1,2,3-propanetriol; 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol. Exemplary tetrols and pentols include: 2,2-bis(hydroxymethyl) propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol).

The present disclosure also provides for the use of polymeric polyols. In an embodiment, the polyol is selected from the group of: polyester polyols; polyether polyols; poly (ether-ester) polyols; poly(alkylene carbonate) polyols; and, mixtures thereof.

Polycarbonate diols having utility herein may be obtained by reacting carbonic acid derivatives with diols. Exemplary carbonic acid derivatives are diaryl carbonates including but not limited to diphenyl carbonate, di(C$_1$-C$_6$)alkyl carbonates and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and, mixtures thereof.

Polyester diols having utility herein may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid; maleic acid; sebacic acid; azelaic acid; terephthalic acid; isophthalic acid; o-phthalic acid; tetrahydrophthalic acid; hexahydrophthalic acid; trimellitic acid; and, 1,4-cyclohexanedicarboxylic acid. Examples of suitable anhydrides include succinic, o-phthalic and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and, mixtures thereof.

Other useful polyester diols are those obtainable from diol initiated polymerization of hydroxycarboxylic acids containing from 2 to 12 carbon atoms or a lactone thereof. The hydroxycarboxylic acids may be saturated or unsaturated, linear or branched, of which example include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, ($C_1$-$C_6$)alkyl-valerolactone, ε-caprolactone and ($C_1$-$C_6$)alkyl-ε-caprolactone.

In an embodiment, the polyol is a polyether polyol. Exemplary polyether polyols may be obtained from the polymerization of a cyclic oxide—such as ethylene oxide, propylene oxide or butylene oxide—or by the addition of one or more such oxides to polyfunctional initiators having at least two active hydrogen atoms, such as water, polyhydric alcohols, polythiols, polyamines and alkanolamines.

In a preferred embodiment, the polyol comprises a polyoxy ($C_2$-$C_3$)alkylene polyol having: a number average molecular weight of from about 200 to about 5000 g/mol.; and, an hydroxyl number of from about 25 to about 500 mg KOH/g. For example, the polyol may comprise a polyoxy ($C_2$-$C_3$)alkylene polyol having: a number average molecular weight of from about 200 to about 1000 g/mol. or from about 200 to about 500 g/mol; and, an hydroxyl number of from about 200 to about 500 mg KOH/g. or from about 200 to 300 mg KOH/g. Polyethylene glycol (PEG) 400 may be mentioned as an exemplary polyoxy ($C_2$-$C_3$)alkylene polyol.

At step 56, the method 50 includes heating the gel under stirring at a temperature of from about 150 to about 300° C. for a sufficient duration to form a dry powder. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns. In some embodiments, the method includes heating the gel under stirring at a temperature of from 150 to about 300° C., for example about 155-290° C., about 160-285° C., about 165-280° C., about 170-275° C., about 175-270° C., about 180-265° C., about 185-260° C. or about 190-255° C. In a preferred embodiment, the gel is heated at about 250° C. under continuous stirring.

At step 58, the method 50 includes calcining the dry powder at a temperature of from about 600 to about 800° C. to form the nanocomposite material. The calcination of the precipitate is carried out by heating it to a high temperature, under a restricted supply of ambient oxygen. This is performed to remove impurities or volatile substances and to incur thermal decomposition. Typically, the calcination is carried out in a furnace preferably equipped with a temperature control system, which may provide a heating rate of up to 50° C. per minute (° C./min), for example up to about 40° C./min, up to about 30° C./min, up to about 20° C./min, up to about 10° C./min, up to about 5° C./min, up to about 2° C./min, or up to about 1° C./min.

In some embodiments, the dry powder is calcined at a temperature of from about 600 to about 800° C., for example about 610-790° C., about 620-780° C., about 630-770° C., about 640-760° C., about 650-750° C., about 660-740° C., about 670-730° C., about 680-720° C. or about 690-710° C.

In some embodiments, the solid is calcined for a duration of from about 1 to about 5 hours, for example from about 1.5 to about 5 hours, from about 2 to about 5 hours, from about 2.5 to about 5 hours, from about 3 to about 5 hours, from about 3.5 to about 5 hours, from about 4 to about 5 hours, from about 4.5 to about 5 hours, or from about 2 to about 4 hours. In a preferred embodiment, the solid is calcined for about 3 hours.

In a particularly preferred embodiment, the dry powder is calcined at about 700° C. for about 3 hours.

It is not precluded in the present method 50 that the particles directly obtained from the calcination step may be subjected to at least one of comminution, homogenization or classification in order to moderate the particle size distribution thereof.

In another aspect of the present disclosure there is provided a method of immobilizing inorganic pollutants disposed in an aqueous medium, the method comprising contacting the aqueous medium with the particulate nanocomposite material. In some embodiments, the inorganic pollutants may include heavy metals such as Pb, mercury Hg, Cd, and As, as well as radioactive isotopes like cesium-137 (Cs-137) and strontium-90 (Sr-90). These pollutants are commonly found in industrial wastewater, mining effluents, and other polluted environments, and they can be efficiently removed or neutralized through various treatment methods, including photocatalytic degradation or adsorption onto nanocomposite materials.

A method of degrading organic pollutants disposed in an aqueous medium is still further described. The method includes contacting the aqueous medium under actinic irradiation with the particulate nanocomposite material as described herein.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

The methods of immobilizing inorganic contaminants and of photocatalytic degradation of organic pollutants both require an aqueous medium to be brought into contact with the particulate nanocomposite material for a sufficient contact time to permit adsorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the particulate nanocomposite material. In this embodiment, the particulate nanocomposite material may need to constrained within a bed or membrane which the aqueous medium contacts as either a perpendicular or tangential (cross-) flow stream.

The following examples are provided solely for illustration and are not to be construed as limitations of the present disclosure, as many variations thereof are possible without departing from the spirit and scope of the present disclosure.

EXAMPLES

The following examples demonstrate a nanocomposite, and a method of preparation thereof. The examples are provided solely for illustration and are not to be construed as limitations of the present disclosure, as many variations thereof are possible without departing from the spirit and scope of the present disclosure.

Figure 1B:
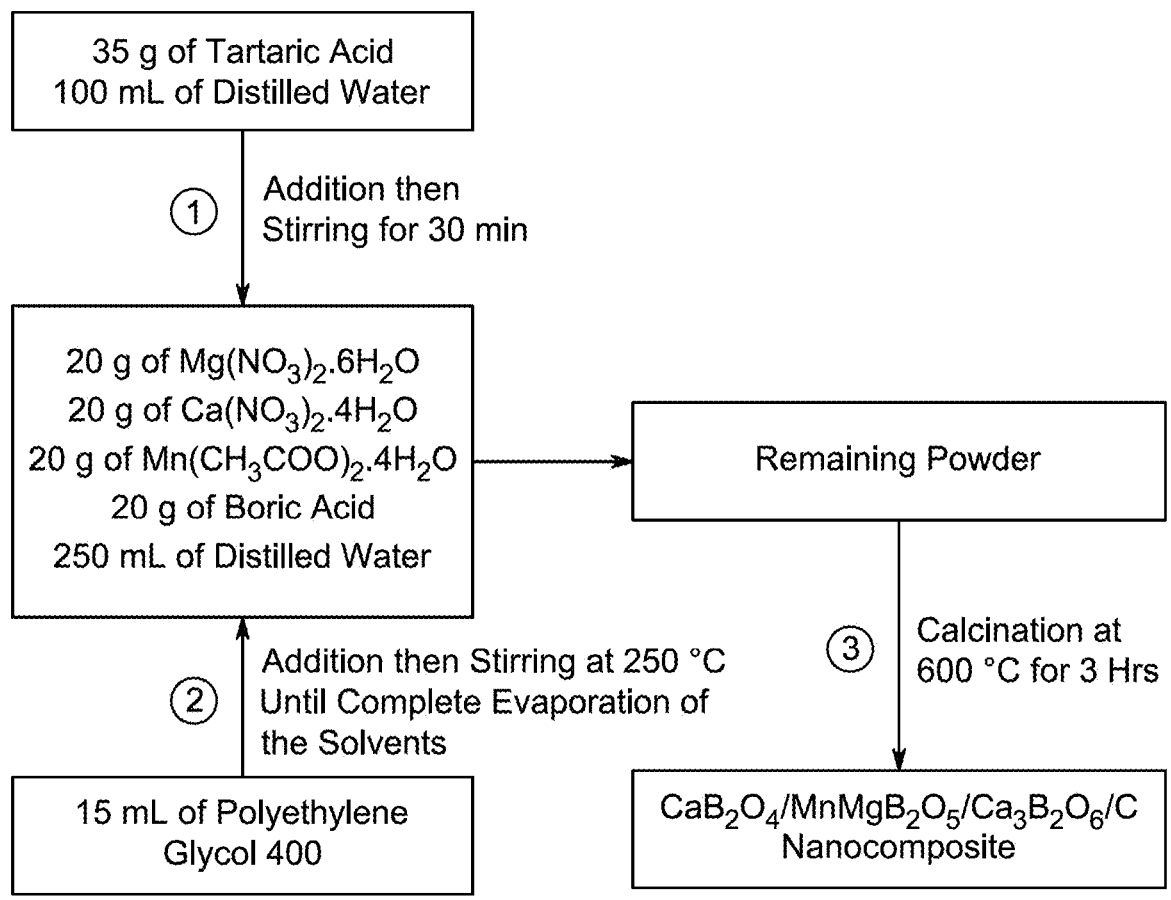
FIG. 1B is a block diagram of an exemplary synthesis of a particulate nanocomposite, according to certain embodiments.

Example 1: Synthesis $CaB_2O_4$/$MnMgB_2O_5$/$Ca_3B_2O_6$/C Nanocomposite Using Pechini Sol-Gel Method According to the present disclosure, the $CaB_2O_4$/$MnMgB_2O_5$/$Ca_3B_2O_6$/C nanocomposite was synthesized using the Pechini sol-gel method, as illustrated in FIGS. 1A-1B. Initially, 35 grams (g) of tartaric acid was dissolved in 100 milliliters (mL) of distilled water. A separate solution was prepared by dissolving 20 g of $Mg(NO_3)_2 \cdot 6H_2O$, 20 g of $Ca(NO_3)_2 \cdot 4H_2O$, and 20 g of $Mn(CH_3COO)_2 \cdot 4H_2O$, and 20 g boric acid in 250 mL of distilled water. The tartaric acid solution was added to the nitrate solution with continuous stirring for 30 minutes. Subsequently, 15 mL of polyethylene glycol 400 was introduced into the mixture, which was stirred continuously and heated at 250° C. until complete evaporation of the solvents occurred. The resulting powder was calcinated at 700° C. for 3 hours to obtain the $CaB_2O_4$/$MnMgB_2O_5$/$Ca_3B_2O_6$/C nanocomposite.

Figure 2:
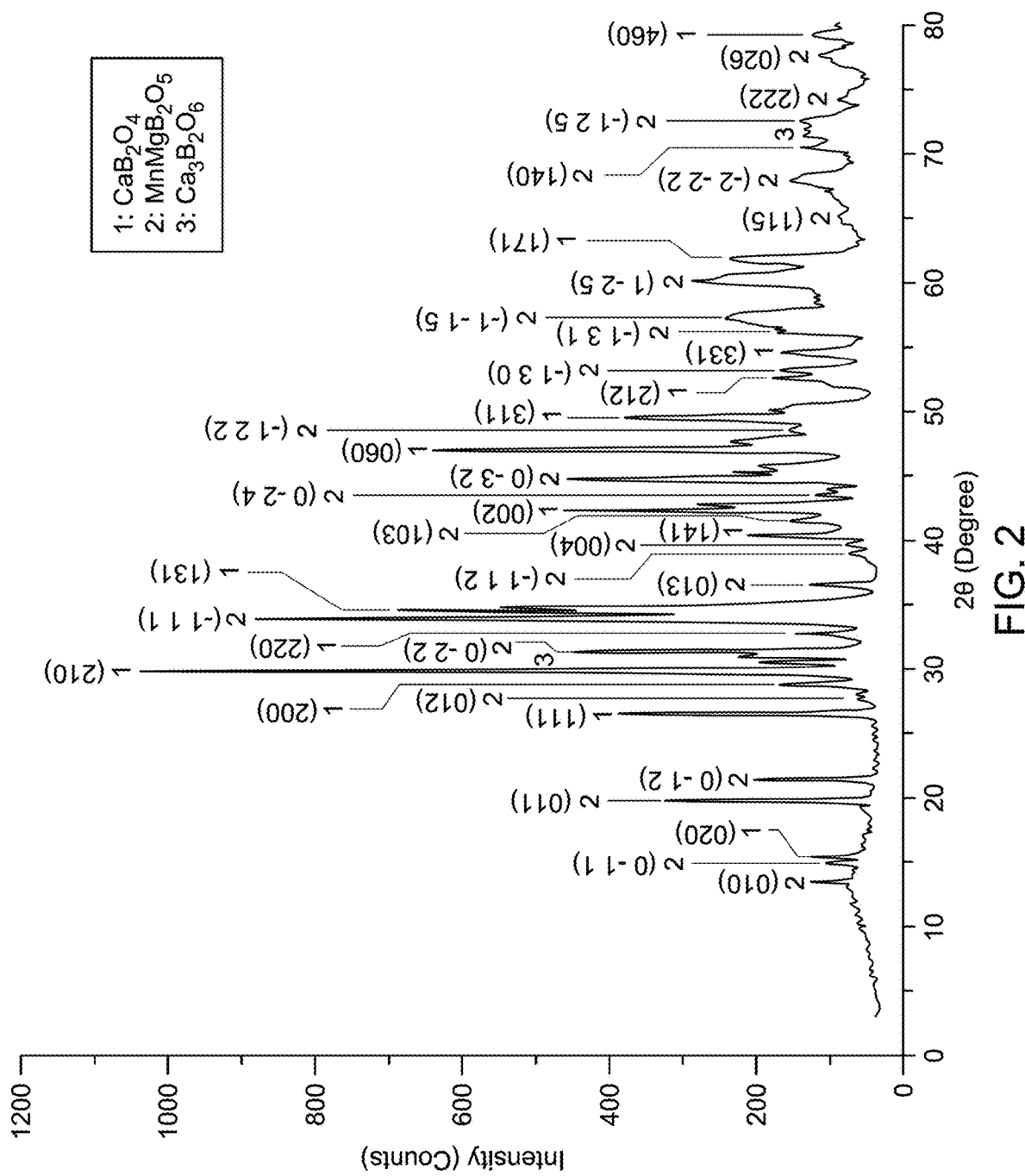
FIG. 2 is a graph depicting the X-ray diffraction (XRD) pattern of the particulate nanocomposite, according to certain embodiments.

The synthesized nanocomposite was analyzed using X-ray diffraction (XRD), and the patterns are shown in FIG. 2, with the XRD results summarized in Table 1. In particular, FIG. 2 depicts the crystalline phases formed in the nanocomposite at the temperature of 700° C. The XRD of the nanocomposite showed the presence of three crystalline phases, namely calcium borate ($CaB_2O_4$), magnesium manganese borate ($MnMgB_2O_5$), and calcium borate ($Ca_3B_2O_6$). The calcium borate phase exhibits an orthorhombic crystal system corresponding to the JCPDS card No. 00-023-0407, the disclosure of which is incorporated herein by reference in its entirety. The magnesium manganese borate phase has a triclinic crystal system as confirmed by JCPDS card No. 01-085-0326, the disclosure of which is incorporated herein by reference in its entirety. The calcium borate phase corresponds to JCPDS card No. 00-003-1089—the disclosure of which is incorporated herein by reference in its entirety— although its crystal system is not yet known. The characteristic diffraction peaks of $CaB_2O_4$ were observed at 2θ angles of 15.32°, 26.43°, 28.64°, 29.69°, 32.74°, 34.51°, 40.29°, 42.28°, 47.01°, 49.52°, 52.46°, 54.56°, 61.69°, and 79.22°, which correspond to the miller indices (020), (111), (200), (210), (220), (131), (141), (002), (060), (311), (212), (331), (171), and (460), respectively. Similarly, the characteristic diffraction peaks of $MnMgB_2O_5$ were located at 2θ angles of 13.42°, 14.90°, 19.72°, 21.30°, 27.79°, 31.26°, 33.78°, 36.41°, 38.81°, 39.56°, 41.44°, 43.43°, 44.69°, 48.48°, 52.98°, 56.14, 57.07°, 60.01°, 65.06°, 67.99°, 70.41, 72.39°, 74.18°, and 77.54°, corresponding to the miller indices (010), (011), (011), (012), (012), (022), (111), (013), (112), (004), (103), (024), (032), (122), (130), (131), (115), (125), (115), (222), (140), (125), (222), and (026), respectively. The diffraction peaks of $Ca_3B_2O_6$ are identified at 2θ angles of 30.31° and 71.35°. The average crystallite size of the synthesized nanocomposite was 69.64 nanometers (nm).

TABLE 1

XRD results for the synthesized particulate nanocomposite

| Components of synthesized nanocomposite | | | | Crystallite size of the nanocomposite (nm) |
|---|---|---|---|---|
| Phase | Chemical name | Card No. | Crystal system | |
| $CaB_2O_4$ | Calcium borate | JCPDS-00-023-0407 | Orthorhombic | 69.64 |
| $MnMgB_2O_5$ | Magnesium manganese borate | JCPDS-01-085-0326 | Triclinic | |
| $Ca_3B_2O_6$ | Calcium borate | JCPDS-00-003-1089 | Not yet known | |

Figure 3:
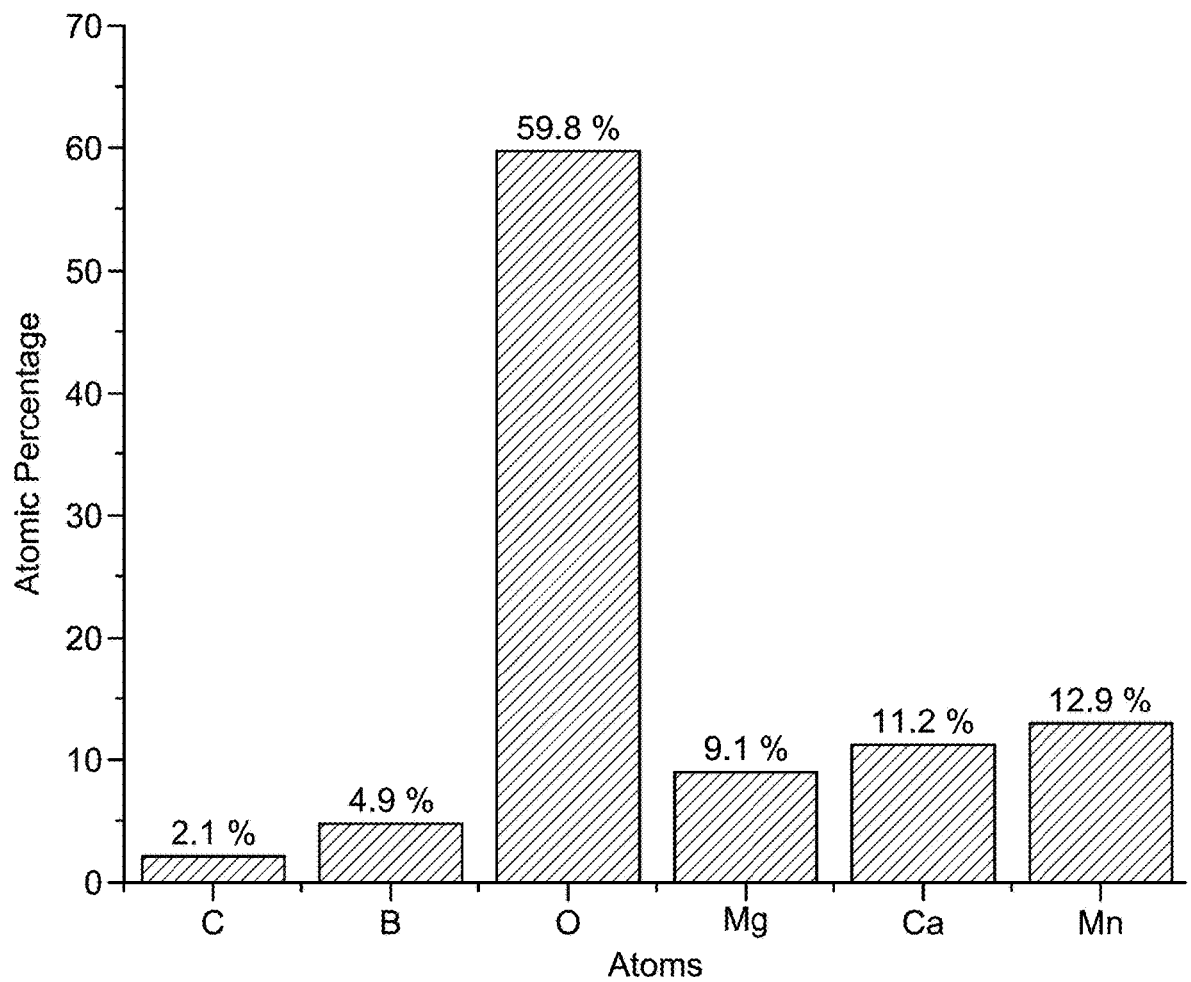
FIG. 3 is a graph depicting atomic percentage distribution of a plurality of elements present in the particulate nanocomposite, according to certain embodiments.

FIG. 3 illustrates the atomic percentage distribution of elements present in the synthesized $CaB_2O_4$/$MnMgB_2O_5$/$Ca_3B_2O_6$/C nanocomposite, as determined by energy-dispersive X-ray (EDX) spectroscopy. The analysis reveals that oxygen (O) was the most abundant element with an atomic percentage (at. %) of 59.8%, followed by manganese (Mn) at 12.9 at. %, calcium (Ca) at 11.2 at. %, magnesium (Mg) at 9.1 at. %, boron (B) at 4.9 at. %, and carbon (C) at 2.1 at. %. The above listed results confirm the successful incorporation of all constituent elements into the nanocomposite and are consistent with the expected chemical composition.

Figure 4:
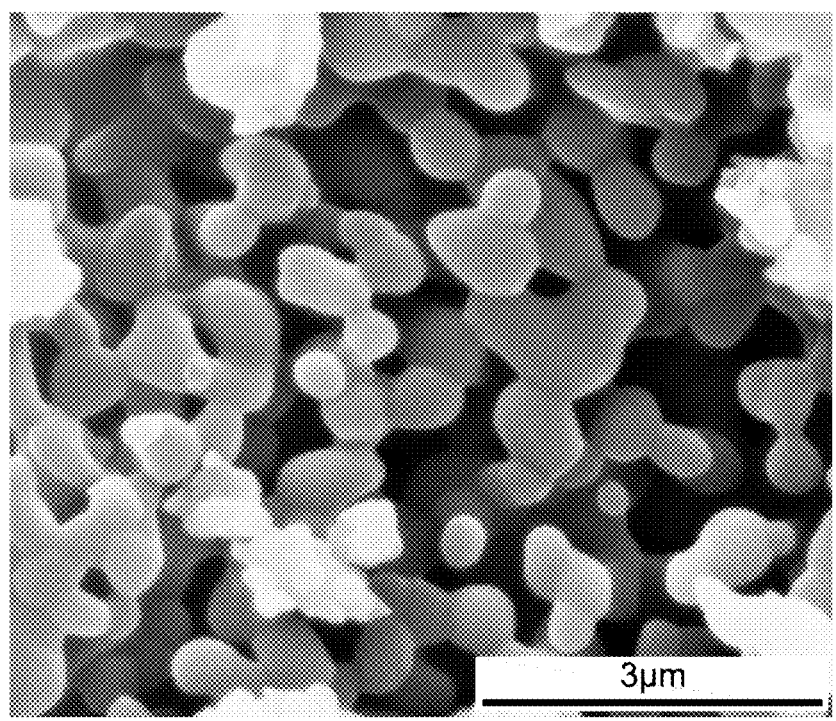
FIG. 4 is a scanning electron microscopy (SEM) image of the particulate nanocomposite, according to certain embodiments.

FIG. 4 shows the scanning electron microscope (SEM) image of the synthesized $CaB_2O_4$/$MnMgB_2O_5$/$Ca_3B_2O_6$/C nanocomposite. In particular, the SEM image revealed the morphological features of the nanocomposite, which consist predominantly of irregular and quasi-spherical grains with some agglomeration. The analysis indicates that the average grain size of the nanocomposite is 440 nm, confirming the nanoscale nature of the material. These observations demonstrate the successful synthesis of the nanocomposite with well-defined grain structures, which are crucial for its potential applications.

Figure 5:
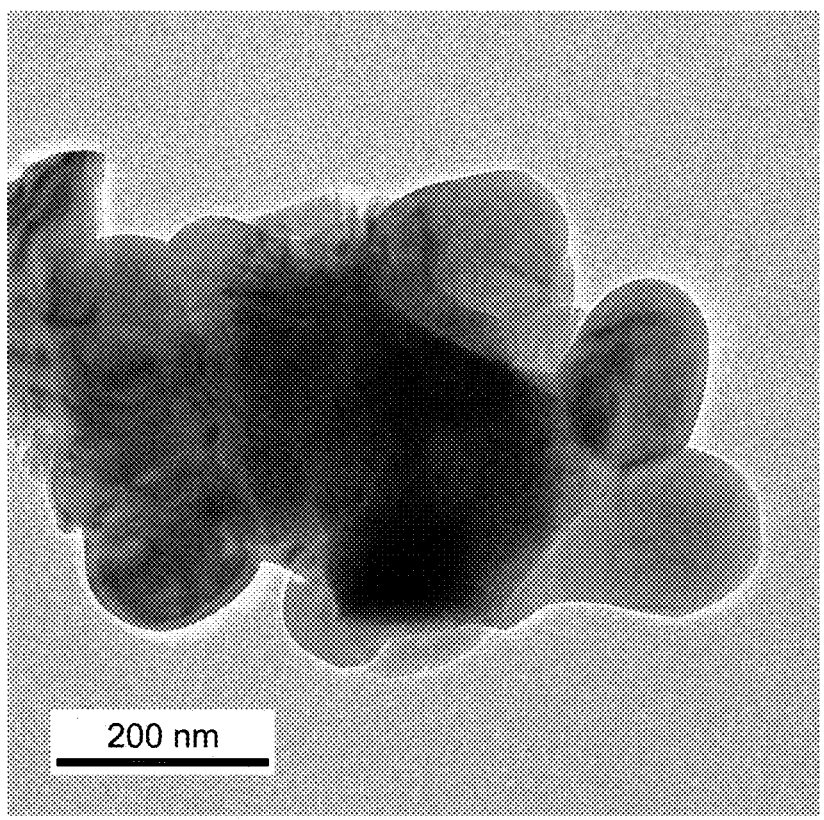
FIG. 5 is a high resolution transmission electron microscopy (HRTEM) image of the particulate nanocomposite, according to certain embodiments.

FIG. 5 depicts the high-resolution transmission electron microscope (HRTEM) image of the synthesized $CaB_2O_4$/$MnMgB_2O_5$/$Ca_3B_2O_6$/C nanocomposite. In particular, FIG. 5 revealed the morphological features of the nanocomposite, characterized by irregularly shaped and quasi-spherical particles which are agglomerated. The analysis indicates that the median volume particle size (Dv50) of the nanocomposite is 148.20 nm. These observations highlight the nanoscale particle size and distinct morphology of the synthesized material, confirming its successful preparation through the Pechini sol-gel method.

The aspects of the present disclosure provide a particulate nanocomposite material. In addition, the present disclosure describes a method of immobilizing inorganic contaminants and degrading organic pollutants in an aqueous medium using the synthesized particulate nanocomposite material. In particular, the particulate nanocomposite material presents a unique structural, compositional, and morphological features that distinguish the described nanocomposite materials from existing technologies. Further, XRD analysis confirms the orthorhombic, triclinic, and unknown crystalline phases of the particulate nanocomposite. An exemplary nanocomposite has an average crystallite size of about 69.64 nm, highlighting the uniformity and nanoscale nature of the material. Furthermore, SEM analysis of that exemplary nanocomposite revealed irregular and quasi-spherical grain shapes with an average grain size of 440 nm, showcasing the successful structural integrity of the composite. Moreover, HRTEM analysis confirms irregularly shaped and quasi-spherical particles with an average particle diameter of 148.20 nm, emphasizing the nanoscale morphology critical for potential applications. In addition, EDX analysis of the exemplary nanocomposite demonstrates an elemental composition with 59.8 atom % oxygen, 12.9 atom % manganese, 11.2 atom % calcium, 9.1 atom % magnesium, 4.9 atom % boron, and 2.1 atom % carbon, confirming the successful incorporation of all constituent elements.

In addition, the particulate nanocomposite materials as synthesized herein, may have potential applications in advanced environmental remediation, including efficient adsorption of heavy metals and organic pollutants from water. The structural and chemical properties of the particulate nanocomposite may render it suitable for use in catalytic processes and as a component in high-performance sensors for detecting environmental contaminants. Additionally, the nanocomposite may be utilized in energy storage devices and electronic applications by leveraging nanoscale morphology and multifunctional capabilities of the particulate nanocomposite.

Numerous modifications and variations of the present disclosure are possible in light of the above teachings. It is therefore to be understood that within the scope of the appended claims, the invention may be practiced otherwise than as specifically described herein.

The invention claimed is:

1. A particulate nanocomposite material comprising, as determined by X-ray diffraction:
   elemental carbon;
   an orthorhombic $CaB_2O_4$ crystalline phase;
   a triclinic $MnMgB_2O_5$ crystalline phase; and,
   a $Ca_3B_2O_6$ crystalline phase;
   wherein, based on the total number of atoms in the nanocomposite material:
   the atomic concentration of carbon (C) is from about 0.1 to about 5 atom %;
   the atomic concentration of calcium (Ca) is from about 5 to about 15 atom %;
   the atomic concentration of boron (B) is from about 1 to about 10 atom %;
   the atomic concentration of manganese (Mn) is from about 5 to about 15 atom %; and,
   the atomic concentration of magnesium (Mg) is from about 5 to about 15 atom %.

2. The particulate nanocomposite material according to claim 1, wherein, based on the total number of atoms in the nanocomposite material:
   the atomic concentration of carbon (C) is from about 1 to about 3 atom %;
   the atomic concentration of calcium (Ca) is from about 9 to about 12 atom %;
   the atomic concentration of boron (B) is from about 3 to about 6 atom %;
   the atomic concentration of manganese (Mn) is from about 12 to about 15 atom %; and,
   the atomic concentration of magnesium (Mg) is from about 7 to about 10 atom %.

3. The particulate nanocomposite material according to claim 1 having a volume average crystallite size, as determined by X-ray diffraction, of from about 65 to about 75 nm.

4. The particulate nanocomposite material according to claim 1 comprising substantially spherical particles and agglomerates thereof.

5. The particulate nanocomposite according to claim 1 comprising globular aggregates of rounded particles.

6. The particulate nanocomposite material according to claim 1 having a median volume particle size (Dv50) of from about 100 to about 200 nm, as determined by high-resolution transmission electron microscopy.

7. The particulate nanocomposite material according to claim 1 having a median volume particle size (Dv50) of from about 125 to about 175 nm, as determined by high-resolution transmission electron microscopy.

8. A method for preparing the particulate nanocomposite material as defined in claim 1, the method comprising:
   forming an aqueous mixture by adding an aqueous solution of a chelating agent into an aqueous solution of a magnesium salt, a calcium salt, a manganese salt and boric acid;
   adding a polyol into the aqueous mixture to form a gel;
   heating the gel under stirring at a temperature of from about 150 to about 300° C. for a sufficient duration to form a dry powder; and,
   calcining the dry powder at a temperature of from about 600 to about 800° C. to form the nanocomposite material.

9. The method according to claim 8, wherein the aqueous solution of the chelating agent is added in a dropwise manner into the aqueous solution of the magnesium salt, the calcium salt, the manganese salt and boric acid.

10. The method according to claim 8, wherein:
    the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$);
    the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$); and,
    the manganese salt is selected from the group consisting of manganese sulfate ($MnSO_4$), manganese nitrate ($Mn(NO_3)_2$), manganese chloride ($MnCl_2$) and manganese acetate ($Mn(CH_3COO)_2$).

11. The method according to claim 8, wherein:
    the magnesium salt is magnesium nitrate ($Mg(NO_3)_2$);
    the calcium salt is calcium nitrate ($Ca(NO_3)_2$); and,
    the manganese salt is manganese acetate ($Mn(CH_3COO)_2$).

12. The method according to claim 8, wherein the chelating agent comprises at least one hydroxyalkyl carboxylic acid selected from the group consisting of citric acid, tartaric acid, malic acid, mandelic acid and 12-hydroxystearic acid.

13. The method according to claim 8, wherein the chelating agent consists of tartaric acid.

14. The method according to claim 8, wherein the polyol is added in a dropwise manner into the aqueous mixture.

15. The method according to claim 8, wherein the polyol has a number average molecular weight (Mn) of from about 200 to about 5000 g/mol. and an hydroxyl number of from about 25 to about 500 mg KOH/g.

16. The method according to claim 8, wherein the polyol is selected from the group consisting of: polyester polyols; polyether polyols; poly(ether-ester) polyols; poly(alkylene carbonate) polyols; and, mixtures thereof.

17. The method according to claim 8, wherein the polyol comprises a polyoxy ($C_2$-$C_3$)alkylene polyol.

18. The method according to claim 17, wherein the polyol comprises a polyoxy ($C_2$-$C_3$)alkylene polyol having a number average molecular weight (Mn) of from about 200 to about 5000 g/mol. and an hydroxyl number of from about 25 to about 500 mg KOH/g.

19. A method of immobilizing inorganic contaminants disposed in an aqueous medium, the method comprising contacting the aqueous medium with the particulate nanocomposite material as defined in claim 1.

20. A method of degrading organic pollutants disposed in an aqueous medium, the method comprising contacting the aqueous medium with the particulate nanocomposite material as defined in claim 1 while irradiating the medium with actinic irradiation.

* * * * *